United States Patent
Levi (10) Patent No.: US 10,170,136 B2
(45) Date of Patent: Jan. 1, 2019

(54) DIGITAL VIDEO SYNTHESIS

(71) Applicant: AL LEVY TECHNOLOGIES LTD., Tel Aviv (IL)

(72) Inventor: Alon Levi, Tel Aviv (IL)

(73) Assignee: AL LEVY TECHNOLOGIES LTD., Tel Aviv (IL)

( * ) Notice: Subject to any disclaimer, the term of this patent is extended or adjusted under 35 U.S.C. 154(b) by 434 days.

(21) Appl. No.: 14/705,205

(22) Filed: May 6, 2015

(65) Prior Publication Data

US 2017/0270950 A1    Sep. 21, 2017

Related U.S. Application Data (60) Provisional application No. 61/990,278, filed on May 8, 2014.

(51) Int. Cl.

| | |
|---|---|
| *G10L 15/00* | (2013.01) |
| *G10L 17/00* | (2013.01) |
| *G10L 25/57* | (2013.01) |
| *G10L 15/04* | (2013.01) |
| *G06F 17/30* | (2006.01) |
| *G06F 17/27* | (2006.01) |

(52) U.S. Cl.
CPC .......... *G10L 25/57* (2013.01); *G06F 17/2775* (2013.01); *G06F 17/30026* (2013.01); *G10L 15/04* (2013.01); *G10L 17/005* (2013.01)

(58) Field of Classification Search
CPC ....... G10L 25/57; G10L 15/04; G10L 17/005; G06F 17/2775; G06F 17/30026
USPC ........................ 704/220, 249, 251
See application file for complete search history.

(56) References Cited

U.S. PATENT DOCUMENTS

| | | |
|---|---|---|
| 2009/0147009 A1 | 6/2009 | Tanaka et al. |
| 2010/0183280 A1 | 7/2010 | Beauregard et al. |
| 2012/0177345 A1 | 7/2012 | Trainer et al. |
| 2013/0294764 A1 | 11/2013 | Maxik et al. |
| 2014/0147095 A1 | 5/2014 | Oz et al. |

*Primary Examiner* — Thierry L Pham
(74) *Attorney, Agent, or Firm* — The Roy Gross Law Firm, LLC; Roy Gross (57) ABSTRACT

A method which includes: detecting phrases in a transcript of an audiovisual file; applying a speech recognition algorithm to the audiovisual file and to a list of words of the phrase, to output a temporal location of each of the words that are uttered in the audio channel; compiling a list of sub-phrases of each of the phrases; creating a temporal sub-phrase map that comprises a temporal location of each of the sub-phrases; extracting the uttered sub-phrases from the audiovisual file, to create multiple sub-phrase audiovisual files; and constructing a database the multiple sub-phrase audiovisual files and of the sub-phrase uttered in each of the files. The method may also include: receiving a phrase; querying the database for audiovisual files which comprise uttered sub-phrases of the phrase; and splicing at least some of the audiovisual files to a compilation audiovisual file in which the phrase is uttered.

20 Claims, 4 Drawing Sheets

Fig. 4

DIGITAL VIDEO SYNTHESIS

CROSS-REFERENCE TO RELATED APPLICATIONS

This application claims the benefit of U.S. Provisional Patent Application No. 61/990,278, filed May 8, 2014 and entitled "Video Generation", the contents of which are incorporated herein by reference in their entirety.

BACKGROUND

The present invention relates to the field of digital video synthesis.

With the spread of broadband Internet access, videos, and short videos in particular (commonly referred as "video clips"), have become very popular online. The widespread popularity of short videos, with the aid of new distribution channels, has in fact evolved into a whole online culture. This culture includes Internet activity of authoring, viewing, sharing and commenting on short videos, mostly less than 15 minutes long.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method comprising using at least one hardware processor for: detecting phrases in a transcript of a digital audiovisual file, wherein each of the phrases is a sequence of words; applying a speech recognition algorithm to an audio channel of the digital audiovisual file and to a list of the words, to output a temporal location of each of the words that are uttered in the audio channel; compiling a list of sub-phrases of each of the phrases, wherein each of the sub-phrases is a sequence of one or more of the words of the phrase, and wherein the sequence of the phrase and the sequence of the sub-phrase have the same order; based on the temporal location of each of the words, creating a temporal sub-phrase map that comprises a temporal location of each of the sub-phrases; based on the temporal sub-phrase map, extracting the uttered sub-phrases from the digital audiovisual file, to create multiple sub-phrase audiovisual files; and constructing a database which comprises (a) a reference to where the multiple sub-phrase audiovisual files are stored and (b) the sub-phrase uttered in each of the multiple sub-phrase audiovisual files.

Another embodiment relates to a computer program product comprising a non-transitory computer-readable storage medium having program code embodied therewith, the program code executable by at least one hardware processor for: detecting phrases in a transcript of a digital audiovisual file, wherein each of the phrases is a sequence of words; applying a speech recognition algorithm to an audio channel of the digital audiovisual file and to a list of the words, to output a temporal location of each of the words that are uttered in the audio channel; compiling a list of sub-phrases of each of the phrases, wherein each of the sub-phrases is a sequence of one or more of the words of the phrase, and wherein the sequence of the phrase and the sequence of the sub-phrase have the same order; based on the temporal location of each of the words, creating a temporal sub-phrase map that comprises a temporal location of each of the sub-phrases; based on the temporal sub-phrase map, extracting the uttered sub-phrases from the digital audiovisual file, to create multiple sub-phrase audiovisual files; and constructing a database which comprises (a) a reference to where the multiple sub-phrase audiovisual files are stored and (b) the sub-phrase uttered in each of the segments.

In some embodiments, the transcript is a script that comprises an identification of persons uttering the phrases.

In some embodiments, the transcript is a subtitles file that comprises the phrases and a timecode for each of the phrases, and wherein the speech recognition algorithm is further applied to the timecode for each of the phrases.

In some embodiments, the creating of the temporal sub-phrase map comprises, for each of the sub-phrases, setting a start time of a first word in the sub-phrase as a start time of the sub-phrase, and an end time of a last word in the sub-phrase as an end time of the sub-phrase.

In some embodiments, the method further comprises including a sub-phrase of the sub-phrases in the temporal sub-phrase map only if the sub-phrase passes a minimum length threshold.

In some embodiments, the minimum length threshold is between 400 and 600 milliseconds.

In some embodiments, the method further comprises including a sub-phrase of the sub-phrases in the temporal sub-phrase map only if the sub-phrase passes an inter-word maximum distance threshold.

In some embodiments, the inter-word maximum distance threshold is between 15 and 30 milliseconds.

In some embodiments: the transcript is a subtitles file that comprises the phrases and a timecode for each of the phrases, and wherein the speech recognition algorithm is further applied to the timecode for each of the phrases; the creating of the temporal sub-phrase map comprises, for each of the sub-phrases, setting a start time of a first word in the sub-phrase as a start time of the sub-phrase, and an end time of a last word in the sub-phrase as an end time of the sub-phrase; and the method further comprises including a sub-phrase of the sub-phrases in the temporal sub-phrase map only if the temporal location of each of the words of the sub-phrase is within the timecode of the phrase from which the sub-phrase stems.

In some embodiments, the program code is further executable by the at least one hardware processor for including a sub-phrase of the sub-phrases in the temporal sub-phrase map only if the sub-phrase passes a minimum length threshold.

In some embodiments, the program code is further executable by the at least one hardware processor for including a sub-phrase of the sub-phrases in the temporal sub-phrase map only if the sub-phrase passes an inter-word maximum distance threshold.

In some embodiments: the transcript is a subtitles file that comprises the phrases and a timecode for each of the phrases, and wherein the speech recognition algorithm is further applied to the timecode for each of the phrases; the creating of the temporal sub-phrase map comprises, for each of the sub-phrases, setting a start time of a first word in the sub-phrase as a start time of the sub-phrase, and an end time of a last word in the sub-phrase as an end time of the sub-phrase; and the program code is further executable by the at least one hardware processor for including a sub-phrase of the sub-phrases in the temporal sub-phrase map only if the temporal location of each of the words of the sub-phrase is within the timecode of the phrase from which the sub-phrase stems.

A further embodiment relates to a method comprising using at least one hardware processor for: receiving a phrase comprising a sequence of words; querying a database for audiovisual files which comprise uttered sub-phrases of the phrase, each of the sub-phrases having a same order of words as in the sequence of words of the phrase; and based on a response of the query, splicing at least some of the audiovisual files to a compilation audiovisual file in which the phrase is uttered.

In some embodiments, the method further comprises using said at least one hardware processor for splitting the phrase into n(n+1)/2 sub-phrases, wherein n is the number of words in the phrase.

In some embodiments, the splitting is performed using a binary tree having n levels.

In some embodiments, the method further comprises using said at least one hardware processor for pruning the audiovisual files so as to single out one combination of audiovisual files for the splicing, wherein the pruning is based on at least one of: confidence scores associated with the audiovisual files, wherein the confidence scores denote the likelihood that the sub-phrases are actually uttered in the audiovisual files; and user ratings of the audiovisual files.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Methods, systems and computer program products are disclosed herein, for synthesizing an audiovisual file, relatively short in duration, which presents one or more celebrities, actors and/or other persons (referred to herein, for simplicity, as "actors") uttering a phrase. The audiovisual file may be synthesized, on the fly, upon request of a user who provides the phrase. Alternatively, a large number of audiovisual files may be prepared prior to a user request, and a suitable one of these audiovisual files be provided to a user responsive to his or her request.

The phrase uttered in the audiovisual file may be generated by splicing multiple audiovisual files extracted from known cinematic films, television series, etc. Thus, the present methods, systems and computer program products may be highly advantageous for entertainment purposes, allowing a user to provide a certain phrase and be immediately provided with an entertaining audiovisual file which contains talking actors from multiple cinematic films, television series, etc. The user may then use the audiovisual file as an alternative to textual communication, for example by electronically transmitting the audiovisual file to another person in lieu of sending a textual message to that person.

Glossary

The term "audiovisual file", as referred to herein, may relate to a digital file which includes both an audio channel and a video channel. When an "audio channel" is mentioned herein, also multiple audio channels which are included in the same audiovisual file are intended. Namely, an audiovisual file may include a video channel and multiple audio channels, such as two audio channels for stereo. For simplicity, all such audio channels may be jointly referred to as an "audio channel".

The terms "phrase" or "sentence", as referred to herein, may relate to a textual unit made of an ordered sequence of one or more words, letters, symbols, digits, or any combination thereof.

The term "sub-phrase", as referred to herein, may relate to a sub-unit (or a "child") of a phrase. Hence, a phrase may include multiple sub-phrases. In such sub-phrase, the one or more words, letters, symbols, digits, etc. appear in the same order as in the "parent" phrase.

The terms "movie file" or simply "movie", as referred to herein, may relate to an audiovisual file, which includes, in its audio channel, speech uttered by actors. The video channel of the movie may depict the actors as they speak, but not necessarily. A movie may be, for example, a cinematic film, a television show, a filmed interview, a newscast and/or the like.

The terms "approximately" and "about", as referred to herein, may relate to a ±10% difference from the value associated with these terms. For example, the term "approximately 100" means "between 90 and 110".

The following description is organized as follows. First, techniques for generating a database of sub-phrase audiovisual files are disclosed. Then, techniques for querying the database and synthesizing a compilation audiovisual file from multiple sub-phrase audiovisual files are discussed.

Generating a Database of Phrase Audiovisual Files

Figure 1:
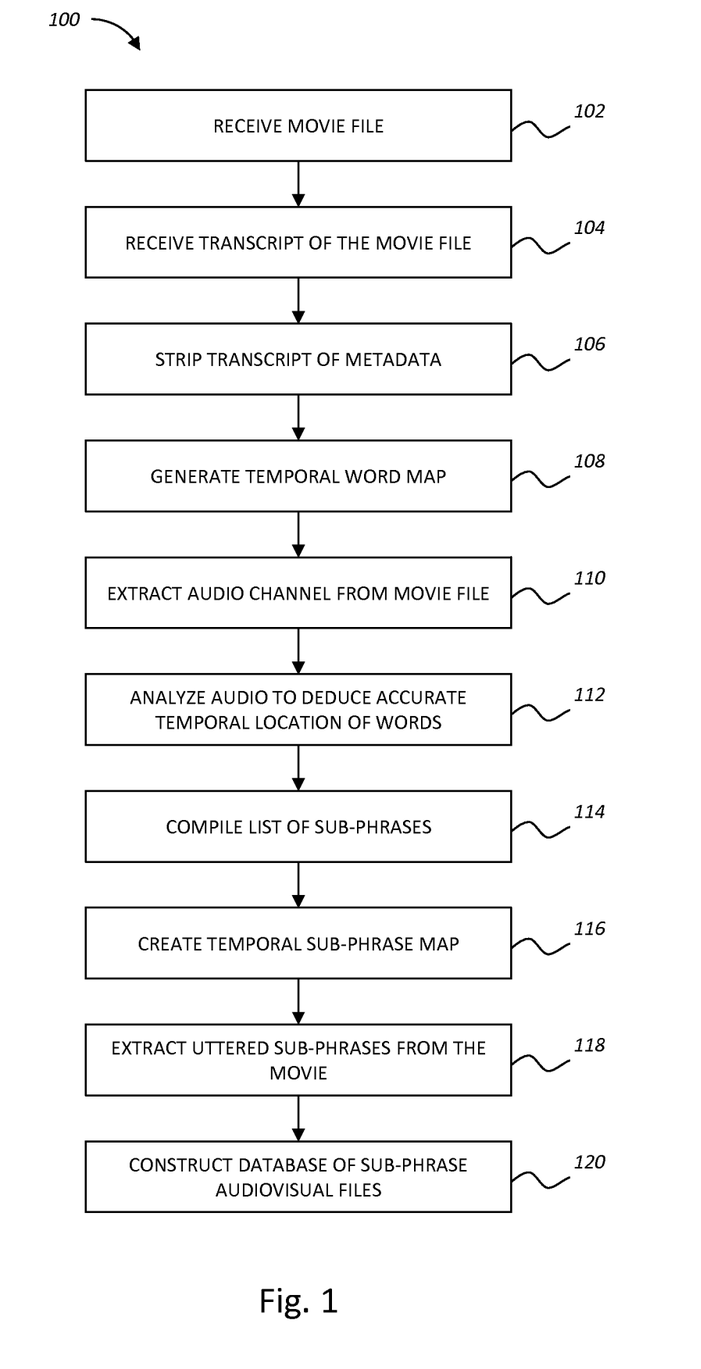
FIG. 1 shows a flow chart of a method for generating a database of sub-phrase audiovisual files.

Reference is now made to FIG. 1, which shows a flow chart of a method 100 for generating a database of sub-phrase audiovisual files, in accordance with an embodiment. Steps of method 100 may be carried out according to the order they are discussed below, in a different order, or even simultaneously; those of skill in the art will recognize changes to the order of steps or even omission of one or more steps, which may still result in a database of phrase audiovisual files.

In a step 102, one or more movie files may be received. For simplicity of discussion, the following description refers to how a single movie file is processed and acted upon. Nonetheless, it is intended for method 100 to include the same process for a plurality of movie files, such that the final database includes sub-phrase audiovisual files originating from multiple different movie files.

In a step 104, a transcript of the movie file (either of the entirety of the movie or of a portion thereof) may be received. The transcript may be a digital text file. Examples of suitable transcripts are the script of the movie and subtitles of the movie. Contrary to subtitle, a script may include, other than the text uttered by actors in the movie, also an identification of the person uttering the text. The transcript may be automatically fetched from resources available on the World Wide Web (or "web" for short). A script or subtitles of a certain movie may be obtained by using an application programming interface (API) of a suitable web site. For example, subtitles may be automatically fetched from the opensubtitles.org web site through its API. See http://trac.opensubtitles.org/projects/opensubtitles/wiki/XMLRPC, last viewed May 2, 2015. Subtitles may be received in a format such as SubRip (see http://en.wikipedia.org/wiki/SubRip, last viewed May 2, 2015) or any other format for timed text (see http://en.wikipedia.org/wiki/Timed_text, last viewed May 2, 2015).

The following is an exemplary segment of a SubRip file:

```
1
00:00:02,002 --> 00:00:04,334
<b>How about the seedless
watermelon? What an invention.</b>
``` where "1" is a serial number of the subtitle, "00:00:02,002-->00:00:04,334" is a timecode, denoting that the subtitles should be displayed from the 2002$^{nd}$ millisecond until the 4334$^{th}$ millisecond of the movie, "How about the seedless watermelon? What an invention." is the text of the subtitle, and "<b>","</b>" are formatting tags, which, in this case, are used to stylize the text as bold. The text is part of the transcript of a Seinfeld show, episode 1 of season 5 (first aired 16 Sep. 1993).

In a step 106, the transcript may be stripped of any metadata, such as punctuation marks, formatting tags and/or timecodes—leaving only the text itself. The stripping of the metadata from the transcript may be carried out, for instance, by applying a suitable regular expression (RegEx) to the digital text file of the transcript.

Continuing upon the above example, the stripped transcript may be:

How about the seedless watermelon What an invention

In a step 108, the stripped transcript or the original transcript may undergo preparation for input into a speech recognition algorithm. The preparation may include the generation of a temporal word map, which lists all words appearing in the stripped transcript and their estimated timecode. Since, at this point, the only timecode available is the one provided with the transcript, each word in the temporal word map will have the same time code, which does not accurately denote when the uttering of the word starts and ends:

```
How -> (2002,4334)
about -> (2002,4334)
the -> (2002,4334)
seedless -> (2002,4334)
watermelon -> (2002,4334)
What -> (2002,4334)
an -> (2002,4334)
invention -> (2002,4334)
```

In a step 110, the entire audio channel or a portion thereof may be extracted from the movie, to create a digital audio file. The extraction may be performed by video processing software, such as FFmpeg (see http://www.ffmpeg.org, last viewed May 2, 2015) or avconv (see https://libav.org/avconv.html, last viewed May 2, 2015). In the creation of the digital file, if the audio channel is actually multiple audio channels (e.g. stereo), they may be combined into a single, mono channel.

In a step 112, the temporal word map may be used to analyze the digital audio file and deduce a more accurate temporal location of words uttered in the digital audio file. The analysis may be performed by applying a speech recognition algorithm to the digital audio file and the temporal word map. For example, a Hidden Markov Models (HMM)-based large vocabulary speech recognition software may be used, and breadth-first search may be performed using the standard Viterbi algorithm and the Bush-Derby algorithm. See, for example, Lamere, P. et al., "The CMU SPHINX-4 speech recognition system", in Proceedings of the IEEE Intl. Conf. on Acoustics, Speech and Signal Processing, Hong Kong (2003).

An exemplary suitable algorithm is the SpeechAligner algorithm, part of the CMU Sphinx 4 toolkit by Carnegie Mellon University. See http://cmusphinx.sourceforge.net, last viewed May 2, 2015. The temporal word map and the digital audio file may be provided as input to the SpeechAligner algorithm, which outputs a list of words and a timecode for each word—the start and end time of the utterance of that word in the digital audio file. The following is an exemplary output of the SpeechAligner algorithm, which continues above the previous example:

```
how -> (2008,2291)
about ->(2291, 2490)
the ->(2490, 2790)
seedless -> (2790, 3180)
watermelon -> (3180, 3330)
what -> (3350, 3790)
an -> (3790, 3990)
invention -> (3990, 4330)
```

As shown, each line in the output includes a word and its start and end times divided by a comma. Optionally, the speech recognition algorithm also outputs a confidence score for each word, which denotes the likelihood that the word is actually uttered between the indicated start and end times. The confidence score, for instance, may be a value between 0 (low confidence) and 1 (high confidence).

In a step 114, a list of sub-phrases of the phrase may be compiled, such that the output of the speech recognition algorithm may be used for marking the start and end time of sub-phrases made of multiple words, and not only of singular words. The list includes all possible sub-phrases stemming from the phrase. To generate that list, it may first be detected what phrase or phrases are included in the text of the transcript. In the above example, the punctuation in the original transcript (the question mark after "watermelon") reveals that it includes two phrases: "How about the seedless watermelon" and "What an invention". Therefore, the list will include all possible sub-phrases for each of these phrases. An exemplary list is shown below:

```
How
How about
How about the
How about the seedless
How about the seedless watermelon
about
about the
about the seedless
about the seedless watermelon
the
```

-continued

```
the seedless
the seedless watermelon
seedless
seedless watermelon
watermelon
What
What an
What an invention
an
an invention
invention
```

As demonstrated by the above exemplary list, the number of possible sub-phrases for each phrase is given by n(n+1)/2, where n is the number of words in the phrase. Every sub-phrase is a sequence of one or multiple words from the phrase, wherein the sequence preserves the order of words in the phrase.

In a step 116, the output of the speech recognition algorithms may be used for creating a temporal sub-phrase map, in which each sub-phrase is timecoded with the start and end times of its utterance.

In a simple implementation of this step, the sub-phrases are timecoded with the start time of the first word of the sub-phrase and the end time of the last word of the sub-phrase. For example, for the sub-phrase "How about", the timecode may be "2008, 2490".

In a more sophisticated implementation of this step, one or more temporal thresholds may be used, to enhance the resulting temporal sub-phrase map. An exemplary threshold is a sub-phrase minimum length. A sub-phrase will be included in the temporal sub-phrase map only if it is longer than the sub-phrase minimum length. In a set of experiments conducted by the inventor, a threshold of approximately 500 milliseconds (ms) has been determined to provide good legibility of a resulting audio file which starts and ends according to the timecode. Namely, a lower threshold, in many common scenarios, might degrade the legibility of the uttered sub-phrase. In simple terms, when a very short audio file is played, it may be difficult for a listener to comprehend the word or multiple words uttered in it. In a different embodiment, however, the threshold may be approximately 450 ms. In a further embodiment, the threshold may be approximately 400 ms. In a further embodiment, the threshold may be approximately 550 ms. In a further embodiment, the threshold may be approximately 600 ms. In a further embodiment, the threshold may be approximately 650 ms. In a further embodiment, the threshold may be approximately 700 ms. In a further embodiment, the threshold may be above 700 ms.

Another threshold may be an inter-word maximum distance threshold, aimed at including a sub-phrase in the temporal sub-phrase map only if the temporal distance between every two adjacent words thereof is smaller than a certain threshold. Namely, if the temporal distance is too large, the resulting audio file may sound unnatural, since it is uncommon for long periods of silence to appear between words of the same sentence. In a set of experiments conducted by the inventor, an inter-word threshold of approximately 20 milliseconds (ms) has been determined to provide good naturalness of a resulting audio file. In a different embodiment, however, the inter-word threshold may be approximately 17 ms. In a further embodiment, the inter-word threshold may be approximately 15 ms. In a further embodiment, the inter-word threshold may be approximately 23 ms. In a further embodiment, the inter-word threshold may be approximately 27 ms. In a further embodiment, the inter-word threshold may be approximately 33 ms. In a further embodiment, the inter-word threshold may be higher than 33 ms.

A further, optional condition for including a sub-phrase in the temporal sub-phrase map is that the start and end times of the sub-phrase, as they appear in the output of the speech recognition algorithm, do not exceed the timecode of the phrase in the transcript. Namely, since the transcript is usually highly-reliable, being the result of manual designation of timecodes, any deviation from its timecodes is an indication of a likely inaccuracy on the part of the speech recognition algorithm.

An exemplary temporal sub-phrase map is shown below:

```
How about -> (2008,2490)
How about the -> (2008,2790)
How about the seedless -> (2008,3180)
How about the seedless watermelon -> (2008,3330)
about -> (2291,2490)
about the -> (2291,2790)
about the seedless -> (2291,3180)
about the seedless watermelon -> (2291,3330)
the seedless -> (2490,3180)
the seedless watermelon -> (2490,3330)
seedless -> (2790,3180)
seedless watermelon -> (2790, 3330)
watermelon -> (3180,3330)
What an -> (3350,3990)
What an invention -> (3350,4330)
an invention -> (3790,3990)
invention -> (3990,4330)
```

Notably, short words, such as "how", "the" and "an" do not appear as sub-phrases in the temporal sub-phrase map, since they do not pass the sub-phrase minimum length threshold.

The temporal sub-phrase map may be formatted as follows: Each line of the map may include a sub-phrase (comprised of one or multiple words), followed by a timecode for that sub-phrase, which denotes the start time and end time it is uttered.

In a step 118, the temporal sub-phrase map may be used for extracting the uttered sub-phrases from the movie, thereby creating multiple audiovisual files whose audio channels sound the sub-phrase—one audiovisual file per sub-phrase. FFmpeg, aconv and/or any other suitable video processing software may be used for this extraction of segments from the movie. The start and end times in the temporal sub-phrase map, together with the movie, may serve as input to this video processing software, and instruct it which segments to extract from the movie.

In a step 120, a database of sub-phrase audiovisual files may be constructed. The database may include a reference to where each of the multiple audiovisual files created in step 118 are stored, as well as the sub-phrase uttered in each of the multiple audiovisual files. In addition, the database may include information which identifies the movie from which the sub-phrases are taken. Exemplary contents of such database are shown in the following table:

TABLE 1

Exemplary database of sub-phrase audiovisual files

| | Sub-phrase | Audiovisual file location | Movie identifier |
|---|---|---|---|
| 1 | How about | http://server/ghvl35iul35234.mp4 | Seinfeld S05E01 |
| 2 | How about | http://server/ghgdh5465g234.mp4 | Seinfeld S05E01 |

TABLE 1-continued

Exemplary database of sub-phrase audiovisual files

| | Sub-phrase | Audiovisual file location | Movie identifier |
|---|---|---|---|
| 3 | the How about the seedless | http://server/ghvl35ifdg4vgg.mp4 | Seinfeld S05E01 |
| 4 | How about the seedless watermelon | http://server/ghvl35idfhg65g.mp4 | Seinfeld S05E01 |
| 5 | about | http://server/ghvl3dfg4gggd.mp4 | Seinfeld S05E01 |
| 6 | about the | http://server/ghvl3546fh456.mp4 | Seinfeld S05E01 |
| 7 | about the seedless | http://server/ghvjfghgdj4635.mp4 | Seinfeld S05E01 |
| 8 | about the seedless watermelon | http://server/ghvlfgfdg6rgf4f.mp4 | Seinfeld S05E01 |
| 9 | the seedless | http://server/ghvlsdfgdf5433.mp4 | Seinfeld S05E01 |
| 10 | the seedless watermelon | http://server/ghvtfdg43fgd53.mp4 | Seinfeld S05E01 |
| 11 | seedless | http://server/ghvl35isgfg4e3.mp4 | Seinfeld S05E01 |
| 12 | seedless watermelon | http://server/ghvl35ifg45gfg.mp4 | Seinfeld S05E01 |
| 13 | watermelon | http://server/ghvl3fgfdg3ddf.mp4 | Seinfeld S05E01 |
| 14 | What an | http://server/ghvl35fg43554.mp4 | Seinfeld S05E01 |
| 15 | What an invention | http://server/ghvl35i5665dg.mp4 | Seinfeld S05E01 |
| 16 | an invention | http://server/ghvl35ifg444fg.mp4 | Seinfeld S05E01 |
| 17 | invention | http://server/ghvl35iusdfsdd.mp4 | Seinfeld S05E01 |

When method 100 is repeated for a large number of movies, such a database may be rich in sub-phrases that may later be used for synthesizing a compilation audiovisual file composed of multiple audiovisual files from the database. The database may include, occasionally, the same sub-phrase taken from different movies, such that the user for which the compilation audiovisual file is synthesized can select not only the sub-phrases themselves but also their origin.

Optionally, the database may also include metadata (not shown in the table above) associated with the movie and/or the sub-phrases. For example, information as to the identity of the actor (or movie character) uttering each sub-phrase. This allows yet a further flexibility for the user, who can select the actor or character uttering every sub-phrase. This information may be acquired, for example, from the script of the video, optionally in combination with an online database of movies, such as IMDb (http://www.imdb.com, last viewed May 2, 2015), TMDb (http://www.themoviedb.org, last viewed May 2, 2015) or TRAKT (http://trakt.tv, last viewed May 2, 2015). These and other online movie databases include APIs, enabling automated access from other software applications, such as a software application which embodies method 100. Accordingly, step 120 of method 100 may additionally include interfacing with such an API for fetching information associated with movies whose sub-phrases are included in the sub-phrase database.

In addition or as an alternative to identifying the uttering actor via the script of the movie, the actor may be identified using computerized face recognition techniques. A face recognition algorithm may receive, as input, a frame from the movie which is located between the start and end times of a sub-phrase, as well as digital photos of all actors participating in that movie; the latter may be fetched through an API of an online movie databases, such as IMDb, TMDb and TRAKT. The algorithm may then match the face depicted in the frame with the correct actor from the digital photos. One suitable algorithm is the Lambda Labs face recognition API 4, available at http://www.lambdal.com, last viewed May 2, 2015. Those of skill in the art will recognize other suitable algorithms.

In addition to or instead of face recognition, the uttering actor may be identified using a text-independent speaker recognition algorithm, as known in the art. See, for example, Kinnunen, Tomi; Li, Haizhou (2010). "An overview of text-independent speaker recognition: From features to supervectors". Speech Communication 52 (1): 12-40.

Optionally, the database may also include the confidence score of step 112. However, since that confidence score is provided per word, some calculation may be done in order to enter a single confidence score per sub-phrase into the database. For example, an average of confidence scores of all words in a sub-phrase may be used. As another example, the lowest confidence score of a word in a sub-phrase may be used.

Alternatives to various steps of method 100 are now discussed:

First, as an alternative to steps 104-108, the speech recognition of step 112 may be performed without any textual aids, namely—without providing a transcript of the movie. Depending on the clarify of speech in the movie as well as optionally other factors, a speech recognition algorithm may successfully output the start and end times of uttered words.

Second, the metadata stripping of step 106 may be omitted, and be carried out as an inherent part of the speech recognition. Namely, the speech recognition algorithm may be configured to treat only words and ignore any metadata.

Third, the speech recognition of step 112 may be performed directly on the movie instead of on a digital audio file extracted from the movie. Namely, the speech recognition algorithm may be configured to run on the audio channel of the movie, thereby sparing the need to first extract the audio channel.

Querying the Sub-Phrase Database and Synthesizing a Compilation

Audiovisual File From Multiple Sub-Phrase Audiovisual Files

Figure 2:
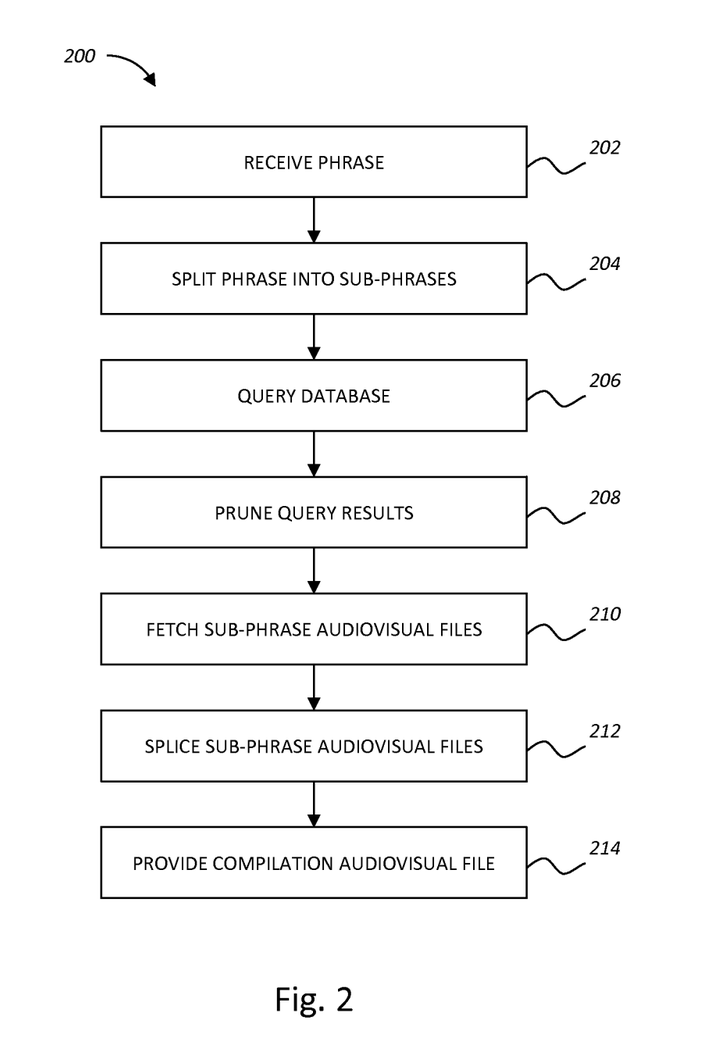
FIG. 2 shows a flow chart of a method for querying a database of sub-phrase audiovisual files and synthesizing a compilation audio visual file from multiple sub-phrase audiovisual files.

Reference is now made to FIG. 2, which shows a flow chart of a method 200 for querying a database of sub-phrase audiovisual files and synthesizing a compilation audio visual file from multiple sub-phrase audiovisual files, in accordance with an embodiment.

Steps of method 200 may be carried out according to the order they are discussed below, in a different order, or even simultaneously; those of skill in the art will recognize changes to the order of steps or even omission of one or more steps, which may still result in a synthesis of a compilation audio visual file from multiple sub-phrase audiovisual files.

In a step 202, a phrase is received. The phrase may include an ordered sequence of words. For example, "seedless watermelon invention". The phrase may be received from a user who types it, for example in a form provided on a web site embodying method 200, in a software application embodying the method, and/or the like.

Optionally, a correction of spelling and/or grammatical errors in the received phrase are automatically performed.

In a step 204, the phrase may be split into sub-phrases, similar to how step 114 of FIG. 1 is carried out. Here, also, the number of possible sub-phrases for each phrase is given by n(n+1)/2, where n is the number of words in the phrase.

Figure 3:
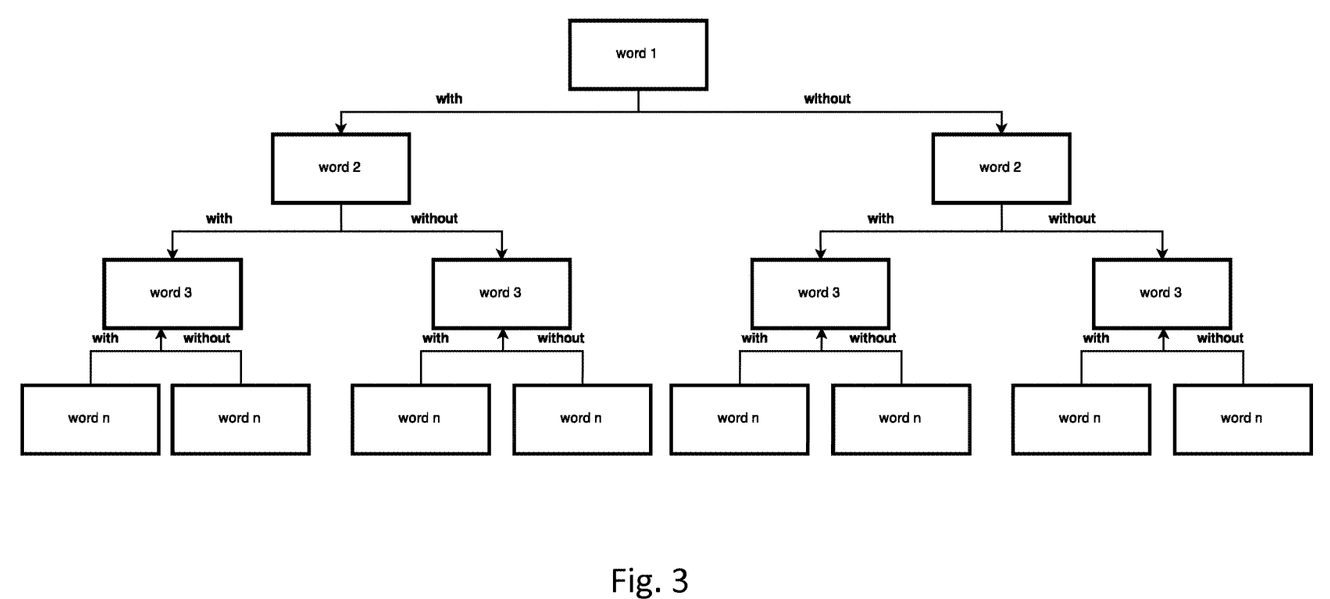
FIG. 3 shows an illustration of a binary tree for a phrase including n words.
Figure 4:
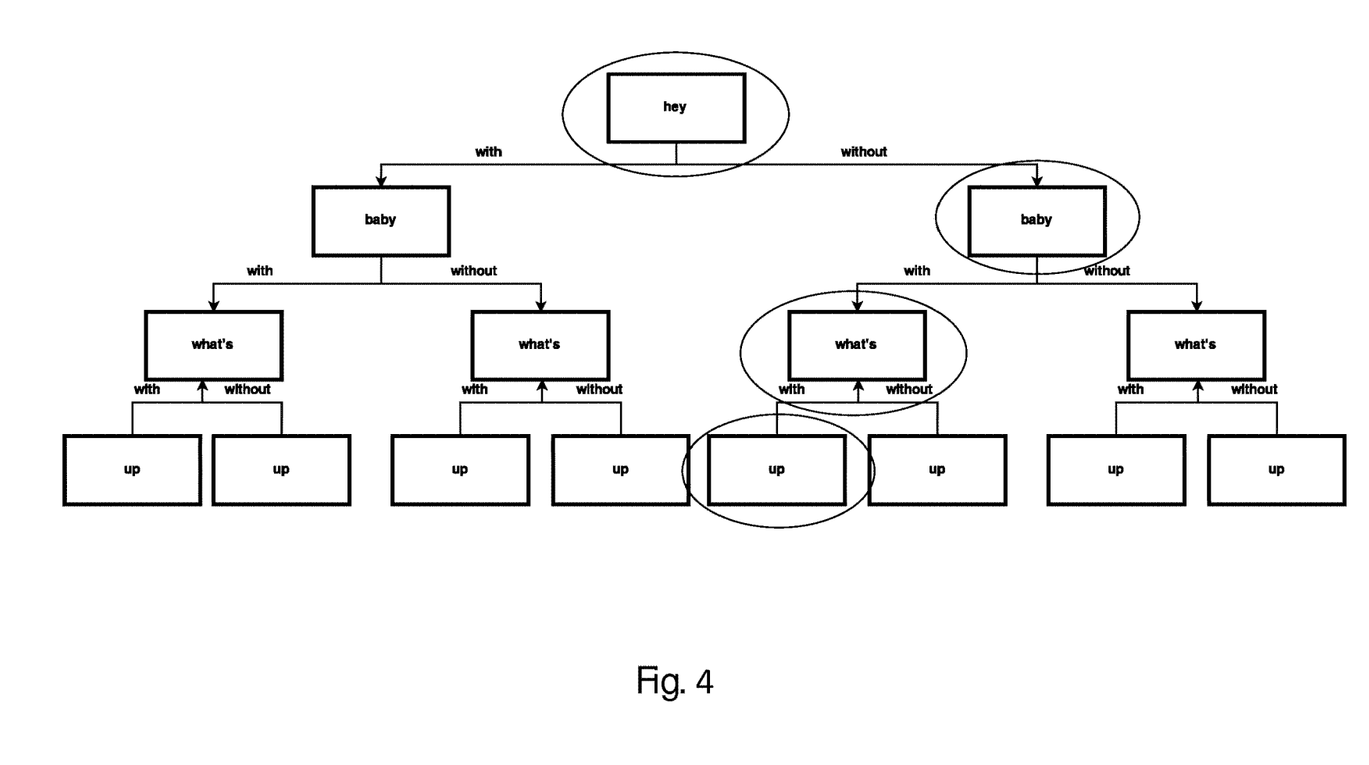
FIG. 4 shows an illustration of a binary tree for the exemplary phrase "hey baby what's up?".

The splitting of the phrase is optionally performed using a binary tree of the phrase. Each level in the tree may include a word of the phrase. Thus, word n may be in level n of the tree. Reference is now made to FIGS. 3 and 4. FIG. 3 shows an illustration of a binary tree for a phrase including n words. FIG. 4 shows an illustration of a binary tree for the exemplary phrase: "hey baby what's up?". As one can see, each consecutive word in the sequence of the words of the phrase may or may not be joined with its previous word—indicated by a "with" or a "without", respectively. This creates sub-phrases of the phrase. Thus, the indication "with" means that two consecutive words are in the same sub-phrase. The indication "without" means that the consecutive words are in separate sub-phrases. Each route in the tree is an option to create the received phrase from one or more sub-phrases. The binary tree may present all the options to divide a phrase into sub-phrases. For example, the route which is marked in circles in FIG. 4 includes the following two sub-phrases: "hey" and "baby what's up".

In a step 206, the database of sub-phrase audiovisual files may be queried for some or all of the sub-phrases created in step 204. In response, the database may provide those of the sub-phrases which are found in the database, as well as the location of the sub-phrase audiovisual file of each found sub-phrase. If the database includes additional metadata for any of the sub-phrases, these may be returned as well. For example, if the received phrase is "seedless watermelon invention", then the query may return, with reference to Table 1:

| 11 | seedless | http://server/ghvl35isgfg4e3.mp4 | Seinfeld S05E01 |
|----|----------|----------------------------------|-----------------|
| 12 | seedless | http://server/ghvl35ifg45gfg.mp4 | Seinfeld S05E01 |
| 13 | watermelon | http://server/ghvl3fgfdg3ddf.mp4 | Seinfeld S05E01 |
| 17 | invention | http://server/ghvl35iusdfsdd.mp4 | Seinfeld S05E01 |

In a step 208, if the results of the query allow for multiple combinations of sub-phrase audiovisual files which may compose a compilation audiovisual file, the results may be pruned so as to single out one combination. The pruning may include, for example, selecting the combination whose member sub-phrase audiovisual files have the highest confidence score. Additionally or alternatively, the pruning may select the combination whose member sub-phrase audiovisual files have been awarded the highest ratings by users. Namely, users may be allowed to rate sub-phrase audiovisual files, and these ratings may be used to select the highest-ranking ones in future synthesis of compilation audiovisual files.

Optionally, the best route out of the possible routes in the binary tree for the received phrase may be calculated. The calculation may be based on scores which may be generated for each possible sub-phrase. Thus, the route having the highest score may be selected. Each sub-phrase in the route may receive a score which may be based on one or more factors, such as user rating, the number of times the sub-phrase was selected by users in the past, the confidence scores, etc.

As an alternative to step 208, the user may be presented with all the different combinations of sub-phrase audiovisual files, and be allowed to select his or her preferable combination for synthesis.

In a step 210, the sub-phrase audiovisual files to compose the compilation audiovisual file may be fetched from their storage location, as indicated in the results returned from the database.

In a step 212, the sub-phrase audiovisual files may be spliced in the correct order to yield the phrase. The splicing may be carried out using suitable video processing software, such as, for example, FFmpeg or avconv.

As an alternative to splicing, which may be resource-intensive, a playlist of the sub-phrase audiovisual files may be constructed. The playlist may include an ordered list of these sub-phrase audiovisual files, and be formatted according to media playlist formats known in the art. Then, when a user wishes to play the compilation, the media player used fetches the sub-phrase audiovisual files based on the playlist, and plays them sequentially—providing the user what appears to be a single compilation audiovisual file.

Optionally, the user may be allowed to upload a movie on his or her own, and this movie is then spliced together with the sub-phrase audiovisual files, to form a longer phrase.

In a step 214, a compilation audiovisual file resulting from the splicing is provided. The compilation audiovisual file contains the entire uttered phrase.

The above-described methods may be applied by a system including one or more servers. Each server may include one or more hardware processors. A user may interact with the system via a communication network (e.g., an intranet or the internet). The one or more servers may further include a non-transitory storage medium. The database of sub-phrase audiovisual files may be stored in the non-transitory storage medium or in a remote computer operatively coupled with the one or more severs. A user may use a local client computer to connect to the one or more servers in order to request a compilation audiovisual file including a phrase. The system may provide the user with the requested compilation audiovisual file based on the provided phrase.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method comprising using at least one hardware processor for:
    detecting phrases in a transcript of a digital audiovisual file, wherein each of the phrases is a sequence of words;
    applying a speech recognition algorithm to an audio channel of the digital audiovisual file and to a list of the words, to output a temporal location of each of the words that are uttered in the audio channel;
    compiling a list of sub-phrases of each of the phrases, wherein each of the sub-phrases is a sequence of one or more of the words of the phrase, and wherein the sequence of the phrase and the sequence of the sub-phrase have the same order;
    based on the temporal location of each of the words, creating a temporal sub-phrase map that comprises a temporal location of each of the sub-phrases;
    based on the temporal sub-phrase map, extracting the uttered sub-phrases from the digital audiovisual file, to create multiple sub-phrase audiovisual files; and
    constructing a database which comprises (a) a reference to where the multiple sub-phrase audiovisual files are stored and (b) the sub-phrase uttered in each of the multiple sub-phrase audiovisual files.

2. The method according to claim 1, wherein the transcript is a script that comprises an identification of persons uttering the phrases.

3. The method according to claim 1, wherein the transcript is a subtitles file that comprises the phrases and a timecode for each of the phrases, and wherein the speech recognition algorithm is further applied to the timecode for each of the phrases.

4. The method according to claim 1, wherein the creating of the temporal sub-phrase map comprises, for each of the sub-phrases, setting a start time of a first word in the sub-phrase as a start time of the sub-phrase, and an end time of a last word in the sub-phrase as an end time of the sub-phrase.

5. The method according to claim 4, further comprising including a sub-phrase of the sub-phrases in the temporal sub-phrase map only if the sub-phrase passes a minimum length threshold.

6. The method according to claim 5, wherein the minimum length threshold is between 400 and 600 milliseconds.

7. The method according to claim 4, further comprising including a sub-phrase of the sub-phrases in the temporal sub-phrase map only if the sub-phrase passes an inter-word maximum distance threshold.

8. The method according to claim 7, wherein the inter-word maximum distance threshold is between 15 and 30 milliseconds.

9. The method according to claim 1, wherein:
   the transcript is a subtitles file that comprises the phrases and a timecode for each of the phrases, and wherein the speech recognition algorithm is further applied to the timecode for each of the phrases;
   the creating of the temporal sub-phrase map comprises, for each of the sub-phrases, setting a start time of a first word in the sub-phrase as a start time of the sub-phrase, and an end time of a last word in the sub-phrase as an end time of the sub-phrase; and
   the method further comprises including a sub-phrase of the sub-phrases in the temporal sub-phrase map only if the temporal location of each of the words of the sub-phrase is within the timecode of the phrase from which the sub-phrase stems.

10. A computer program product comprising a non-transitory computer-readable storage medium having program code embodied therewith, the program code executable by at least one hardware processor for:
   detecting phrases in a transcript of a digital audiovisual file, wherein each of the phrases is a sequence of words;
   applying a speech recognition algorithm to an audio channel of the digital audiovisual file and to a list of the words, to output a temporal location of each of the words that are uttered in the audio channel;
   compiling a list of sub-phrases of each of the phrases, wherein each of the sub-phrases is a sequence of one or more of the words of the phrase, and wherein the sequence of the phrase and the sequence of the sub-phrase have the same order;
   based on the temporal location of each of the words, creating a temporal sub-phrase map that comprises a temporal location of each of the sub-phrases;
   based on the temporal sub-phrase map, extracting the uttered sub-phrases from the digital audiovisual file, to create multiple sub-phrase audiovisual files; and
   constructing a database which comprises (a) a reference to where the multiple sub-phrase audiovisual files are stored and (b) the sub-phrase uttered in each of the segments.

11. The computer program product according to claim 10, wherein the creating of the temporal sub-phrase map comprises, for each of the sub-phrases, setting a start time of a first word in the sub-phrase as a start time of the sub-phrase, and an end time of a last word in the sub-phrase as an end time of the sub-phrase.

12. The computer program product according to claim 11, wherein the program code is further executable by the at least one hardware processor for including a sub-phrase of the sub-phrases in the temporal sub-phrase map only if the sub-phrase passes a minimum length threshold.

13. The computer program product according to claim 12, wherein the minimum length threshold is between 400 and 600 milliseconds.

14. The computer program product according to claim 11, wherein the program code is further executable by the at least one hardware processor for including a sub-phrase of the sub-phrases in the temporal sub-phrase map only if the sub-phrase passes an inter-word maximum distance threshold.

15. The computer program product according to claim 14, wherein the inter-word maximum distance threshold is between 15 and 30 milliseconds.

16. The computer program product according to claim 10, wherein:
   the transcript is a subtitles file that comprises the phrases and a timecode for each of the phrases, and wherein the speech recognition algorithm is further applied to the timecode for each of the phrases;
   the creating of the temporal sub-phrase map comprises, for each of the sub-phrases, setting a start time of a first word in the sub-phrase as a start time of the sub-phrase, and an end time of a last word in the sub-phrase as an end time of the sub-phrase; and
   the program code is further executable by the at least one hardware processor for including a sub-phrase of the sub-phrases in the temporal sub-phrase map only if the temporal location of each of the words of the sub-phrase is within the timecode of the phrase from which the sub-phrase stems.

17. The method according to claim 1, further comprising using said at least one hardware processor for:
   receiving a new phrase comprising a sequence of words;
   querying the database for those of the multiple sub-phrase audiovisual files which comprise uttered sub-phrases of the new phrase, each of the uttered sub-phrases queried for having a same order of words as in the sequence of words of the new phrase; and
   based on a response of the query, splicing at least some of the sub-phrase audiovisual files to a compilation audiovisual file in which the new phrase is uttered.

18. The method according to claim 17, wherein the compiling of the list of sub-phrases comprises splitting each of the phrases into n(n+1)/2 sub-phrases, wherein n is the number of words in the respective phrase.

19. The method according to claim 18, further comprising using said at least one hardware processor for splitting the new phase using a binary tree having a number of levels that equals the number of words in the new phrase.

20. The method according to claim 17, further comprising using said at least one hardware processor for pruning the sub-phrase audiovisual files so as to single out one combination of sub-phrase audiovisual files for the splicing, wherein the pruning is based on at least one of:
   confidence scores associated with the sub-phrase audiovisual files, wherein the confidence scores denote the likelihood that the sub-phrases are actually uttered in the sub-phrase audiovisual files; and
   user ratings of the sub-phrase audiovisual files.

* * * * *